(12) United States Patent
Kato et al.

(10) Patent No.: US 7,316,829 B2
(45) Date of Patent: Jan. 8, 2008

(54) LIQUID CRYSTAL COMPOSITION AND DISPLAY DEVICE

(75) Inventors: Takashi Kato, Kanagawa (JP); Koji Takaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/430,889

(22) Filed: May 10, 2006

(65) Prior Publication Data

US 2006/0269696 A1  Nov. 30, 2006

(30) Foreign Application Priority Data

May 11, 2005 (JP) .............................. 2005-138482

(51) Int. Cl.
  *C09K 19/52* (2006.01)
  *C09K 19/60* (2006.01)
  *C09K 19/54* (2006.01)

(52) U.S. Cl. ................... 428/1.1; 428/1.3; 252/299.01; 252/299.1; 252/299.5

(58) Field of Classification Search .......... 252/299.01, 252/299.1, 299.5; 428/1.1, 1.3
See application file for complete search history.

(56) References Cited

U.S. PATENT DOCUMENTS

| | | | | |
|---|---|---|---|---|
| 5,645,758 A | * | 7/1997 | Kawasumi et al. | ..... 252/299.01 |
| 5,766,508 A | * | 6/1998 | Kawasumi et al. | ..... 252/299.01 |
| 2004/0232382 A1 | * | 11/2004 | Okamura et al. | ........ 252/299.5 |
| 2005/0072962 A1 | * | 4/2005 | Takaku | ................... 252/299.01 |
| 2005/0173673 A1 | * | 8/2005 | Kitagawa | ................ 252/299.62 |
| 2005/0218375 A1 | * | 10/2005 | Katoh et al. | ............ 252/299.01 |
| 2006/0054860 A1 | * | 3/2006 | Katoh et al. | ............. 252/299.1 |
| 2006/0060822 A1 | * | 3/2006 | Takaku et al. | ......... 252/299.01 |
| 2006/0263543 A1 | * | 11/2006 | Takaku et al. | ................ 428/1.1 |

FOREIGN PATENT DOCUMENTS

| | | |
|---|---|---|
| JP | 7-318982 A | 12/1995 |
| JP | 2004-75821 A | 3/2004 |

* cited by examiner

*Primary Examiner*—Shean C Wu
(74) *Attorney, Agent, or Firm*—Birch, Stewart, Kolasch & Birch, LLP

(57) ABSTRACT

A liquid crystal composition comprising a dichroic dye, a host liquid crystal and at least one kind of solid matter having an average particle diameter of 1 nm to 10 m, the dichroic dye having a substituent represented by the following formula (1):

$-(Het)_j-\{(B^1)_p-(Q^1)_q-(B^2)_r\}_n-C^1$:  Formula (1)

wherein Het is an oxygen atom or a sulfur atom; $B^1$ and $B^2$ each independently represent an arylene group, a heteroarylene group, or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5, respectively; n represents an integer of 1 to 3; the sum of the groups represented by $B^1$ and $B^2$ is an integer of 3 to 10; when p, q and r are respectively 2 or greater, two or more of $B^1$, $Q^1$ or $B^2$ may be the same or different; when n is 2 or greater, two or more of $\{(B^1)_p-(Q^1)_q-(B^2)_r\}$ may be the same or different.

20 Claims, No Drawings

LIQUID CRYSTAL COMPOSITION AND DISPLAY DEVICE

CROSS-REFERENCE TO RELATED APPLICATION

This application claims priority under 35 USC 119 from Japanese Patent Application No. 2005-138482, the disclosure of which is incorporated by reference herein.

BACKGROUND OF THE INVENTION

1. Field of the Invention

The present invention relates to a liquid crystal composition containing a solid matter having a specified size, a dichroic dye having a specified substituent and a host liquid crystal; and a display device using the liquid crystal composition.

2. Description of the Related Art

High visibility and low electric power consumption are characteristics that are required in display devices. A guest-host display device is known as a liquid crystal device (liquid crystal display device) which satisfies the above-mentioned requirements. Such a display device can achieve bright display and is expected to be used as a display device suitable for a reflective display device.

For instance, a liquid crystal composition comprising a dichroic dye having a specified substituent and a host liquid crystal, and a guest-host display device using the composition have been disclosed (see, for example, Japanese Patent Application Laid-Open (JP-A) No. 2004-75821).

On the other hand, a guest-host display device comprising a clay compound as an inorganic compound having a submicron size, a nematic liquid crystal and a dichroic dye has been proposed (see, for example, JP-A No. 7-318982).

However, further improvement in display performance, particularly in visibility, is still demanded.

With the objectives of realizing a light absorption state which is independent of polarization and providing a memory function in a guest-host reflective display device, the inventors of the present invention examined a system wherein a solid matter having a submicron size is mixed into a host liquid crystal with a dichroic dye. As a result, the inventors of the present invention newly found problems such as a low order parameter of the dichroic dye and a deterioration in display performance caused by the dichroic dye being absorbed by the surface of the solid matter.

Further, the inventors of the present invention found an unexpected effect; namely, that when a dichroic dye having a specified substituent is used, the adsorption of the dichroic dye to the solid matter is suppressed, and the performance, especially the display performance, is improved. A further study was then made based on these findings to complete the invention.

SUMMARY OF THE INVENTION

The present invention provides a guest-host liquid crystal composition having a light-absorption state which is independent of polarization, and a display device comprising the liquid crystal composition.

A first aspect of the present invention provides a liquid crystal composition comprising at least a dichroic dye, a host liquid crystal and further containing at least one kind of solid matter having an average particle diameter of 1 nm to 10 μm, the dichroic dye having a substituent represented by the following formula (1):

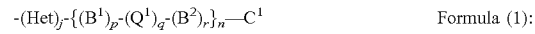

Formula (1):

In Formula (1), Het is an oxygen atom or a sulfur atom; $B^1$ and $B^2$ each independently represent an arylene group, a heteroarylene group, or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5, respectively; n represents an integer of 1 to 3; the sum of the groups represented by $B^1$ and $B^2$ is an integer of 3 to 10; when p, q and r are respectively 2 or greater, two or more of $B^1$, $Q^1$ or $B^2$ may be the same or different; when n is 2 or greater, two or more of $\{(B^1)_p$-$(Q^1)_q$-$(B^2)_r\}$ may be the same or different.

A second aspect of the invention provides a display device having a pair of electrodes, wherein at least one electrode is a transparent electrode, and a liquid crystal layer sandwiched between the pair of the electrodes, the liquid crystal layer containing the liquid crystal composition provided by the first aspect of the invention.

DETAILED DESCRIPTION OF THE INVENTION

The present invention will be described in detail in the following. Hereinafter, use of the term "to" between two numerical values indicates a range which includes the two values as the minimum and the maximum.

The liquid crystal composition of the present invention is a composition comprising at least a dichroic dye, a host liquid crystal and further containing at least one solid matter having an average particle diameter of 1 nm to 10 μm, the dichroic dye having a substituent represented by the following formula (1):

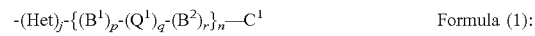

Formula (1):

In formula (1), Het is an oxygen atom or a sulfur atom; $B^1$ and $B^2$ each represent independently an arylene group, a heteroarylene group, or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5, respectively; n represents an integer of 1 to 3; the sum of the groups represented by $B^1$ and $B^2$ is an integer of 3 to 10; when p, q and r are respectively 2 or greater, two or more of $B^1$, $Q^1$, or $B^2$ may be the same or different; when n is 2 or greater, two or more of $\{(B^1)_p$-$(Q^1)_q$-$(B^2)_r\}$ may be the same or different.

A display device containing the above-described liquid crystal composition of the present invention exhibits high visibility, display contrast and high stability which can suppress deterioration of display performance caused by repeated use. Since the ordinary nematic liquid crystal has a uniaxially oriented state, the liquid crystal composition prepared by mixing the uniaxially oriented nematic liquid crystal and a dichroic dye lets a half of the light transmit because only the linearly polarized light oriented in one direction, out of the two which are orthogonally crossing, is absorbed by the composition.

However, by using a liquid crystal composition comprising a solid matter having a specified size for a liquid crystal layer of a display device, the light-absorption and the contrast can be enhanced.

It is surmised that the solid matter having a specified size is positioned as a defect center and the uniaxially-oriented alignment of a host liquid crystal is disturbed, in other words, aligned three-dimensionally, whereby the dichroic dye is enabled to increase the efficiency in light-absorption in all the directions, and hence high contrast can be realized.

Moreover, with the use of the liquid crystal composition of the present invention, a property such as retaining a condition at the time that a voltage is applied even after the voltage is not applied any more, i.e. a memory function, may be provided. In such cases, it is sufficient to apply the voltage only when the information is to be rewritten, which has the advantage of significantly lowering electric power consumption.

In the following, the composition of the present invention will be described in detail.

(Solid Matter Having a Specified Particle Diameter)

An average particle diameter of the solid matter according to the present invention is 1 nm to 10 µm, preferably 10 nm to 5 µm, more preferably 10 nm to 1 µm, and particularly preferably 10 nm to 0.5 µm. When the average particle diameter is less than 1 nm, it is difficult to disperse a solid matter stably into a host liquid crystal, and when it is more than 10 µm, a property as an optical shutter may be deteriorated because of the light being scattered.

In this specification, the term "average particle diameter" means a value measured in accordance with a dynamic light scattering method (e.g. a value measured by Nanotrac particle size distribution measuring apparatus, UPA-ST, manufactured by NIKKISO Co., Ltd.).

Any shape of the solid matter may be used, e.g. a granular shape or a flat shape. When the solid matter is granular in shape, the above-described average particle diameter indicates a value measured in accordance with a dynamic light scattering method (e.g. a value measured by the Nanotrac particle size distribution measuring apparatus, UPA-ST, manufactured by NIKKISO Co., Ltd.). When the solid matter is flat in shape, the average particle diameter indicates an average value of a major axis of a particle diameter measured on the basis of an electron micrograph.

It is preferable that the shape of the solid matter is flat, since it is easier to dispose such flat-shaped solid matter horizontally to a support substrate, which means it is also easier to dispose a dichroic dye horizontally, hence the light can be absorbed efficiently.

A thickness of a flat-shaped solid matter is preferably 1 nm to 500 nm, and more preferably 10 nm to 100 mm.

When a thickness of the flat-shaped solid matter is represented by d, and the broadest width of the flat-shaped solid matter, measured by disposing horizontally and photographing from the right-above direction, is represented by L, the aspect ratio defined by L/d is preferably 1.2 to 100 and more preferably 1.5 to 50. In this specification, the major axis of the above-described flat-shaped solid matter is defined as L.

The particle-size distribution is, although not particularly limited, preferably monodisperse.

Examples of a material used for the solid matter in the present invention include a metal (e.g. a scale-like aluminum), a metal oxide (e.g. a titanium oxide, an aluminum oxide), a clay mineral, an organic material, a ceramic, a graphite, a silica gel and the like.

The flat-shaped solid matter in the present invention is preferably a clay mineral, which may be either natural or synthetic products. Examples of such clay minerals include a montmorillonite, a mica and a hectorite, and preferably a montmorillonite. The average particle diameter of the flat-shaped clay mineral is preferably 0.1 µm to 1.0 µm, and more preferably 0.1 µm to 0.5 µm.

Examples of the granular solid matter include a titanium oxide, an alumina, a silica gel and a polymer. Examples of the polymer include a polystyrene, a polymethyl methacrylate and the like. Preferable examples of the granular solid matter in the present invention are nanoparticles of a titanium oxide, a silica gel and a polystyrene, wherein the average diameter is preferably 10 nm to 0.1 µm, more preferably 10 nm to 50 nm.

Surface modification is preferably applied to a solid matter used in the present invention for the purpose of improving its mutual solubility with a liquid crystal. Methods for surface modification include the use of a titanium coupling agent (e.g. an isopropyltriisostearoyl titanate), a silane coupling agent (e.g. a pentadecafluorodecyl trimethyl silane), an aluminum coupling agent (e.g. an acetoalkoxy aluminum diisopropylate); and graft polymerization. As the method of graft polymerization, processes such as polyethylene graft polymerization and polystyrene graft polymerization may be applied when the solid matter is a titanium oxidice; and a graft polymerization with the use of silanol groups when the solid matter is a silica gel.

The ratio of the area to be subjected to surface modification to a total surface area of the solid matter is within the range of 10% to 100%, and more preferably within the range of 50% to 100%.

The solid matter used in the present invention preferably has an electric field reactivity to enhance the reactivity of the display device, e.g. a solid matter which is provided with a partial structure of a liquid crystal on the surface. Examples of the partial structure of a liquid crystal provided on the surface of the solid matter include the substituent represented by above-described Formula (1), an azomethine, a cyanobiphenyl, a cyanophenyl ester, a fluorine-substituted phenyl ester, a cyclohexanecarboxylic acid phenyl ester, a phenylpyrimidine, a tolan and a phenyldioxane; and preferably a cyanobiphenyl and the substituent represented by Formula (1).

Preferable method of surface modification is to react the solid matter with a surface modifier having a functional group (e.g. an amino group and a carboxylic acid group) which is reactive to the solid matter in the presence of an acid catalyst, a basic catalyst or a condensing agent (e.g. a dicyclohexylcarbodiimide). More preferable method is to react the clay mineral with a surface modifier having an amino group in the presence of an acid catalyst (e.g. a hydrochloric acid), in an alcohol solvent.

Reaction temperature for surface modification is preferably within the range of room temperature to 100° C.

As the method for adjusting a particle diameter of the solid matter used in the present invention, known methods, e.g. a method for dispersing a pigment, can be used.

In order to improve the light-absorption of a dichroic dye, it is preferable that the solid matter used in the present invention has the shape of cubic, flattened, acicular, elliptical or spherical; and more preferably flat-shaped.

(Dichroic Dye)

The dichroic dye used in the present invention has a substituent represented by the above-mentioned Formula (1).

By using the solid matter having a specified particle diameter used in to the present invention and the above-described dichroic dye, the state of light absorption becomes independent of polarization. Although the interrelationship between these two components is not clarified, it is surmised that an interaction occurs between the surface of the solid matter and a host liquid crystal; the shape of the solid matter influences the orientation of the host liquid crystal; and as a result the host liquid crystal changes its uniaxial orientation into three-dimension like, positioning the solid matter as a defect center.

In the present invention, the dichroic dye is defined as a compound which is dissolved in a host liquid crystal and has a light-absorbing property. The maximum light-absorbing wavelength and light-absorbing band of the dichroic dye of the present invention is not specifically limited, but it is preferred to have an absorption maximum in a yellow region (Y), a magenta region (M), or a cyan region (C). The dichroic dye may be used either alone or in combination. When used in combination, it is preferred to use the dichroic dyes having absorption maximums in Y, M, and C regions, respectively. Methods of displaying a full-color image by mixing a yellow dye, a magenta dye and a cyan dye is described in detail in "Color Chemistry" (by Sumio Tokita, Maruzen Company, Limited, 1982). In this specification, the yellow region, the magenta region and the cyan region respectively correspond to the range of 430 to 490 nm, 500 to 580 nm and 600 to 700 nm.

The chromophore used in the dichroic dye in the present invention is herein described.

From the viewpoint of enhancing the display performance, examples of the chromophore used in the present invention include, but not limited to, an azo dye, an anthraquinone dye, a perylene dye, a melocyanine dye, an azomethine dye, a phthaloperylene dye, an indigo dye, an azulene dye, a dioxazine dye, a polythiophene dye, and a phenoxazone dye (phenoxazine-3-on); to be specific, the dichroic dyes listed in "Dichroic Dyes for Liquid Crystal Display" (A. V. Ivashchenko, CRC, 1994).

Preferable examples of the dichroic dye used in the present invention include an azo dye, an anthraquinone dye, a perylene dye, and a phenoxazone dye, and more preferably an anthraquinone and/or a phenoxazone dye. In particular, the dichroic dyes used in the present invention are the dyes described above which have a substituent represented by Formula (1) below.

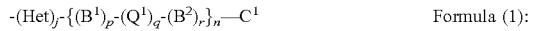

Formula (1): -(Het)$_j$-{(B$^1$)$_p$-(Q$^1$)$_q$-(B$^2$)$_r$}$_n$—C$^1$

In the formula (1), Het is an oxygen atom or a sulfur atom, and preferably a sulfur atom; B$^1$ and B$^2$ each represent independently an arylene group, a heteroarylene group or a divalent cyclic aliphatic hydrocarbon group, either of which may have a substituent or not; The arylene group represented by B$^1$ or B$^2$ preferably has 6 to 20 carbon atoms, and more preferably 6 to 10 carbon atoms, and preferable examples thereof include a phenylene group, a naphthalene group and an anthracene group, and more preferably a substituted phenylene group, and further preferably a 1,4-phenylene group.

The heteroarylene group represented by B$^1$ or B$^2$ preferably has 1 to 20 carbon atoms, and more preferably 1 to 10 carbon atoms, and preferable examples thereof include a group comprising a pyridine ring, a quinoline ring, an isoquinoline ring, a pyrimidine ring, a pyrazine ring, a thiophene ring, a furan ring, an oxazole ring, a thiazole ring, an imidazole ring, a pyrazol ring, an oxadiazole ring, a thiadiazole ring and a triazole ring; and a group formed by the condensation of aforementioned rings wherein two carbon atoms of the condensed ring are respectively removed of one hydrogen atom.

The divalent cyclic aliphatic hydrocarbon group represented by B$^1$ or B$^2$ preferably has 4 to 30 carbon atoms, and more preferably 6 to 20 carbon atoms, and preferable thereof include a cyclohexanediyl and a cyclopentanediyl; more preferably a cyclohexane-1,2-diyl group, a cyclohexane-1,3-diyl group, a cyclohexane-1,4-diyl group and a cyclopentane-1,3-diyl group; and particularly preferably an (E)-cyclohexane-1,4-diyl group.

A divalent arylene group, a divalent heteroarylene group, or a divalent cyclic aliphatic hydrocarbon group represented by B$^1$ and B$^2$ may further have a substituent, and examples thereof are included in the following Group V.

(Group V)

A halogen atom (e.g. a chlorine, a bromine, an iodine and a fluorine), a mercapto group; a cyano group; a carboxyl group; a phosphoric group; a sulfo group; a hydroxy group; a carbamoyl group having 1 to 10, preferably 2 to 8, and more preferably 2 to 5 carbon atoms (e.g. a methylcarbamoyl group, an ethylcarbamoyl group and a morpholinocarbonyl group); a sulfamoyl group having 0 to 10, preferably 2 to 8, and more preferably 2 to 5 carbon atoms (e.g. a methylsulfamoyl group, an ethylsulfamoyl group and a piperidionosulfonyl group); a nitro group; an alkoxy group having 1 to 20, preferably 1 to 10, and more preferably 1 to 8 carbon atoms (e.g. a methoxy group, an ethoxy group, a 2-methoxyethoxy group and a 2-phenylethoxy group); an aryloxy group having 6 to 20, preferably 6 to 12, and more preferably 6 to 10 carbon atoms (e.g. a phenoxy group, a p-methylphenoxy group, a p-chlorophenoxy group and a naphthoxy group); an acyl group having 1 to 20, preferably 2 to 12, and more preferably 2 to 8 carbon atoms (e.g. an acetyl group, a benzoyl group and a trichloroacetyl group); an acyloxy group having 1 to 20, preferably 2 to 12, and more preferably 2 to 8 carbon atoms (e.g. an acetyloxy group and a benzoyloxy group); an acylamino group having 1 to 20, preferably 2 to 12, and more preferably 2 to 8 carbon atoms (e.g. an acetylamino group); a sulfonyl group having 1 to 20, preferably 1 to 10, and more preferably 1 to 8 carbon atoms (e.g. a methanesulfonyl group, an ethanesulfonyl group and a benzenesulfonyl group); a sulfinyl group having 1 to 20, preferably 1 to 10, and more preferably 1 to 8 carbon atoms (e.g. a methanesulfinyl group, an ethanesulfinyl group and a benzenesulfinyl group); a substituted or a non-substituted amino group having 1 to 20, preferably 1 to 12, and more preferably 1 to 8 carbon atoms (e.g. an amino group, a methylamino group, a dimethylamino group, a benzylamino group, an anilino group, a diphenylamino group, a 4-methylphenylamino group, a 4-ethylphenylamino group, a 3-n-propylphenylamino group, a 4-n-propylphenylamino group, a 3-n-butylphenylamino group, a 4-n-butylphenylamino group, a 3-n-pentylphenylamino group, a 4-n-pentylphenylamino group, a 3-trifluoromethylphenylamino group, a 4-trifluoromethylphenylamino group, a 2-pyridylamino group, a 3-pyridylamino group, a 2-thiazolylamino group, a 2-oxazolylamino group, a N,N-methylphenylamino group and a N,N-ethylphenylamino group); an ammonium group having 0 to 15, preferably 3 to 10, and more preferably 3 to 6 carbon atoms (e.g. a trimethylammonium group, and a triethylammonium group); a hydrazino group having 0 to 15, preferably 1 to 10, and more preferably 1 to 6 carbon atoms (e.g. a trimethylhydrazino group); a ureido group having 1 to 15, preferably 1 to 10, and more preferably 1 to 6 carbon atoms (e.g. a ureido group and a N,N-dimethylureido group); an imido group having 1 to 15, preferably 1 to 10, and more preferably 1 to 6 carbon atoms (e.g. a succineimido group); an alkylthio group having 1 to 20, preferably 1 to 12, and more preferably 1 to 8 carbon atoms (e.g. a methylthio group, an ethylthio group, and a propylthio group); an arylthio group having 6 to 80, preferably 6 to 40, and more preferably 6 to 30 carbon atoms (e.g. a phenylthio group, a p-phenylthio group, a p-chlorophenylthio group, a 2-pyridylthio group, a 1-naphtylthio group, a 2-naphtylthio group, a 4-propylcyclohexyl-4'-biphenylthio group, a 4-butylcyclohexyl-4'-biphenylthio group, a 4-pentylcyclohexyl-4'-biphenylthio group and a 4-propylphenyl-2-ethynyl-4'-biphenylthio group); a heteroarylthio group having 1 to 80, preferably 1 to 40, and more preferably 1 to 30 carbon atoms (e.g. a 2-pyridylthio group, a 3-pyridylthio group, a 4-pyridylthio group, a 2-quinolylthio group, a 2-furylthio group, and a 2-pyrolylthio group); an alkoxycarbonyl group having 2 to 20, preferably 2 to 12, and more preferably 2 to 8 carbon atoms (e.g. a methoxycarbonyl group, an ethoxycarbonyl group, and a 2-benzyloxycarbonyl group); an aryloxycarbonyl group having 6 to 20, preferably 6 to 12, and more preferably 6 to 10 carbon atoms (e.g. a phenoxycarbonyl group); a non-substituted alkyl group having 1 to 18, preferably 1 to 10, and more preferably 1 to 5 carbon atoms (e.g. a methyl group, an ethyl group, a propyl group, and a butyl group); a substituted alkyl group having 1 to 18, preferably 1 to 10, and more preferably 1 to 5 carbon atoms (e.g. a hydroxymethyl group, a trifluoromethyl group, a benzyl group, a carboxyethyl group, an ethoxycarbonylmethyl group and an acetylaminomethyl group, wherein an unsaturated hydrocarbon group having 2 to 18, preferably 3 to 10, and more preferably 3 to 5 carbon atoms, e.g. a vinyl group, an ethynyl group, a 1-cyclohexenyl group, a benzylidyne group and a benzylidene group is also to be included in the substituted alkyl group); a substituted or a nonsubstituted aryl group having 6 to 20, preferably 6 to 15, and more preferably 6 to 10 carbon atoms (e.g. a phenyl group, a naphthyl group, a p-carboxyphenyl group, a p-nitrophenyl group, a 3,5-dichlorophenyl group, a p-cyanophenyl group, a m-fluorophenyl group, a p-tolyl group, a 4-propylcyclohexyl-4'-biphenyl group, a 4-butylcyclohexyl-4'-biphenyl group, a 4-pentylcyclohexyl-4'-biphenyl group and a 4-propylphenyl-2-ethynyl-4'-biphenyl group); and a substituted or a non-substituted heteroaryl group having 1 to 20, preferably 2 to 10, and more preferably 4 to 6 carbon atoms (e.g. a pyridyl group, a 5-methylpyridyl group, a thienyl group, a furyl group, a morpholino group and a tetrahydrofurfuryl group).

Substituents in Group V can form a condensed structure with a benzene ring or a naphthalene ring. Onto the substituents in Group V, other substituents in Group V may further be substituted.

Among Group V, preferable examples of a substituent for a divalent arylene group, a divalent heteroarylene group or a divalent cyclic aliphatic hydrocarbon group represented by $B^1$ and $B^2$ include; an above-mentioned alkyl group, an aryl group, an alkoxy group, an aryloxy group, a halogen atom, an amino group, a substituted amino group, a hydroxy group, an alkylthio group and an arylthio group, and more preferably an alkyl group, an aryl group and a halogen atom.

In Formula (1), $Q^1$ represents a divalent linking group comprising an atomic group comprising at least one kind of atom selected from a carbon atom, a nitrogen atom, a sulfur atom and an oxygen atom.

The divalent linking group represented by $Q^1$ preferably has 0 to 60, more preferably 0 to 30, and further preferably 0 to 10 carbon atoms.

Preferable examples of the divalent linking group represented by $Q^1$ include a divalent linking group having 0 to 60 carbon atoms comprising one or more of an alkylene group, an alkenylene group, an amide group, an ether group, a sulfoamide group, a sulfonic acid ester group, a ureido group, a sulfonyl group, a sulfinyl group, a thioether group, a carbonyl group, a —NR— group wherein R is a hydrogen atom, an alkyl group, or an aryl group), an azo group, an azoxy group and a heterocyclic ring divalent group.

The alkylene group represented by $Q^1$ is preferably an alkylene group having 1 to 20 carbon atoms, more preferably 1 to 10 carbon atoms, e.g. a methylene group, an ethylene group, a propylene group, a butylene group, a pentylene group, and a cyclohexyl-1,4-diyl group.

The alkenylene group represented by $Q^1$ is preferably an alkenylene group having 1 to 20 carbon atoms, more preferably 1 to 10 carbon atoms, e.g. an ethynylene group.

The alkynilene group represented by $Q^1$ is preferably an alkynilene group having 2 to 20 carbon atoms, more preferably 2 to 10 carbon atoms, and includes, e.g. an ethynylene group.

The alkyl group represented by R in a —NR— group is preferably an alkyl group having 1 to 10 carbon atoms, more preferably 1 to 6 carbon atoms, and an aryl group represented by R in a —NR— group is preferably an aryl group having 6 to 20 carbon atoms, more preferably 6 to 10 carbon atoms.

The heterocyclic ring represented by $Q^1$ is preferably a piperazine group, e.g. a piperazine-1,4-diyl group.

The divalent linking group represented by $Q^1$ is preferably an alkylene group, an alkenylene group, an alkynylene group, an ether group, a thioether group, an amido group, an ester group, a carbonyl group and a combination of these groups; further preferably an alkylene group and an ester group.

$Q^1$ in the formula (1) may further have a substituent, e.g. the substituent in Group V.

In the formula (1), $C^1$ represents an alkyl group, a cycloalkyl group, an alkoxy group, an alkoxycarbonyl group, an acyl group, or an acyloxy group.

Preferable examples of $C^1$ include an alkyl group or a cycloalkyl group having 1 to 30 carbon atoms, preferably 1 to 12 carbon atoms, and more preferably 1 to 8 carbon atoms; an alkoxy group having 1 to 20 carbon atoms, preferably 1 to 10 carbon atoms, and more preferably 1 to 8 carbon atoms; an acyloxy group having 1 to 20 carbon atoms, preferably 2 to 12 carbon atoms, and more preferably 2 to 8 carbon atoms; an acyl group having 1 to 30 carbon atoms, preferably 1 to 12 carbon atoms, and more preferably 1 to 8 carbon atoms; and an alkoxycarbonyl group having 2 to 20 carbon atoms, preferably 2 to 12 carbon atoms, and more preferably 2 to 8 carbon atoms.

The above-described alkyl group, cycloalkyl group, alkoxy group, alkoxycarbonyl group, acyl group and acyloxy group may or may not have a substituent, e.g. the substituent in Group V.

The substituent for the alkyl group represented by $C^1$, selected from Group V, is preferably a halogen atom (a fluorine atom, a chlorine atom, a bromine atom and an iodine atom), a hydroxy group, an alkoxy group (a methoxy group in particular), and an aryl group (a phenyl group in particular).

The substituent for the alkoxy group represented by $C^1$, selected from Group V, is preferably a halogen atom (a fluorine atom), an alkoxy group (a methoxy group and an ethoxy group in particular), and an aryl group (a phenyl group in particular).

The substituent for the alkoxycarbonyl group represented by $C^1$, selected from Group V, is preferably a halogen atom (a fluorine atom) and an alkoxy group (a methoxy group in particular).

The substituent for the acyl group represented by $C^1$, selected from Group V, is preferably a halogen atom (a fluorine atom) and an alkoxy group (a methoxy group in particular).

The substituent for the acyloxy group represented by $C^1$, selected from Group V, is preferably a halogen atom (a fluorine atom) and an alkoxy group (a methoxy group in particular).

Specific examples of the alkyl group and the cycloalkyl group represented by $C^1$ include a methyl group, an ethyl group, a propyl group, a butyl group, a tert-butyl group, an i-butyl group, a s-butyl group, a pentyl group, a tert-pentyl group, a hexyl group, a heptyl group, an octyl group, a cyclohexyl group, a 4-methyl cyclohexyl group, a 4-ethyl cyclohexyl group, a 4-propyl cyclohexyl group, a 4-butyl cyclohexyl group, a 4-pentyl cyclohexyl group, a hydroxy methyl group, a trifluoromethyl group, and a benzyl group.

Specific examples of the alkoxy group represented by $C^1$ include a methoxy group, an ethoxy group, a 2-methoxyethoxy group, a 2-phenylethoxy group, and a trifluoromethoxy group.

Specific examples of the acyloxy group represented by $C^1$ include an acetyloxy group, and a benzoyloxy group.

Specific examples of the acyl groups represented by $C^1$ include an acetyl group, a formyl group, a pivaloyl group, a 2-chloroacetyl group, a stearoyl group, a benzoyl group, and a p-n-octyloxyphenylcarbonyl group.

Specific examples of the alkoxycarbonyl groups represented by $C^1$ include a methoxycarbonyl group, an ethoxycarbonyl group, and a 2-benzyloxycarbonyl group.

It is particularly preferable that $C^1$ is an alkyl group or an alkoxy group, and more preferably an ethyl group, a propyl group, a butyl group, a pentyl group, a hexyl group or a trifluoromethoxy group.

In Formula (1), j is 0 or 1, and preferably 0; p, q, and r each represent independently an integer of 0 to 5; n represents an integer of 1 to 3; (p+r)×n is an integer of 3 to 10, more preferably an integer of 3 to 6. When p, q, or r is 2 or greater, two or more of $B^1$, $Q^1$, and $B^2$ may be the same or different; when n is 2 or greater, two or more of $\{(B^1)_p\text{-}(Q^1)_q\text{-}(B^2)_r\}$ may be the same or different.

Preferable combinations of p, q, r and n are as follows:
(i) p=3, q=0, r=0, n=1
(ii) p=4, q=0, r=0, n=1
(iii) p=5, q=0, r=0, n=1
(iv) p=2, q=0, r=1, n=1
(v) p=2, q=1, r=1, n=1
(vi) p=1, q=1, r=2, n=1
(vii) p=3, q=1, r=1, n=1
(viii) p=2, q=0, r=2, n=1
(ix) p=1, q=1, r=1, n=2
(x) p=2, q=1, r=1, n=2 wherein particularly preferred combinations are (i) p=3, q=0, r=0, n=1; (iv) p=2, q=0, r=1, n=1; and (v) p=2, q=1, r=1, n=1.

It is further preferable that the $-\{(B^1)_p\text{-}(Q^1)_q\text{-}(B^2)_r\}_n\text{—}C^1$ has a partial structure having a liquid crystallinity. Any phase of the liquid crystal is applicable, but preferably a nematic liquid crystal, a smectic liquid crystal and a discotic liquid crystal; and particularly preferably a nematic liquid crystal and a smectic liquid crystal.

Specific examples of the $-\{(B^1)_p\text{-}(Q^1)_q\text{-}(B^2)_r\}_n\text{—}C^1$ are shown hereinafter, but the present invention is not limited to them (In the formulae, a wavy line represents a linking position).

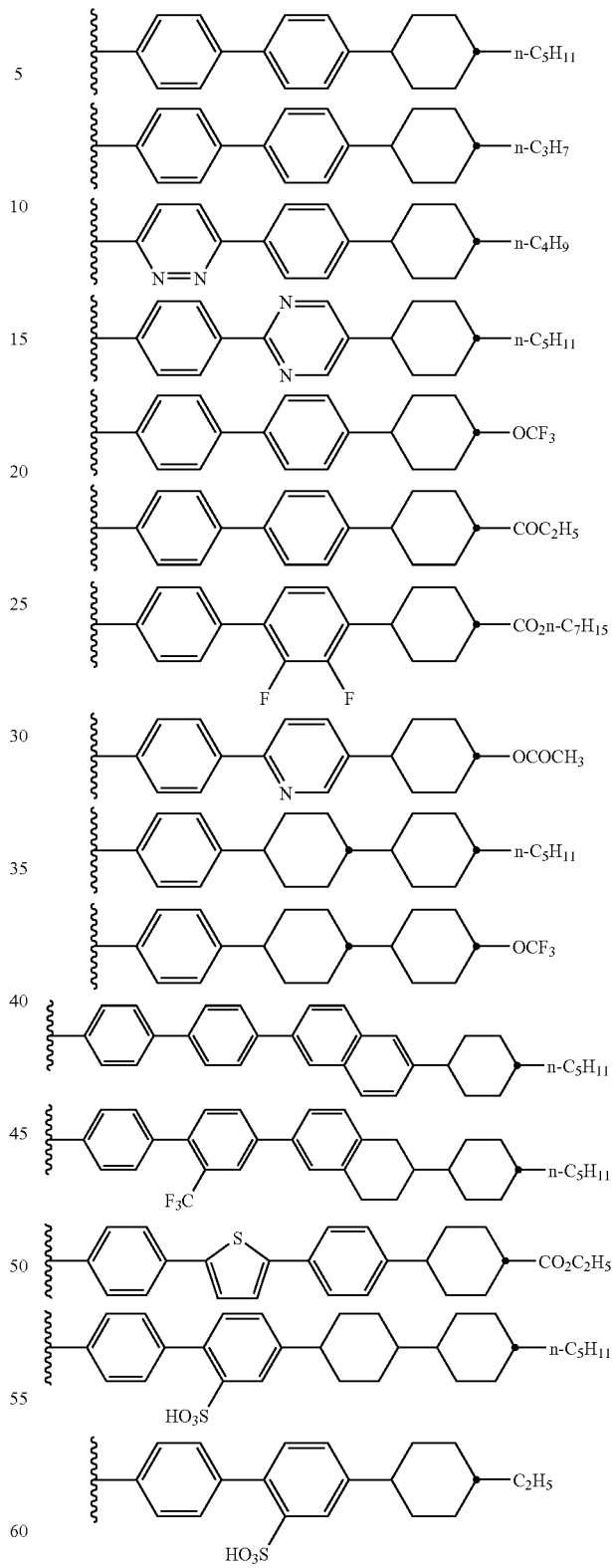

The dichroic dye used in the invention preferably has one or more of the substituent represented by Formula (1), more preferably 1 to 8, further preferably 1 to 4, and particularly preferably 1 to 2.

Preferable structures of the substituents represented by the above-described formula (1) are given by the following combinations:

[1] A structure wherein Het is a sulfur atom; $B^1$ is an aryl group or a heteroaryl group; $B^2$ is a cyclohexane-1,4-diyl group; $C^1$ is an alkyl group; j=1; p=2; q=0; r=1; and n=1.

[2] A structure wherein Het is a sulfur atom; $B^1$ is an aryl group or a heteroaryl group; $B^2$ is a cyclohexane-1,4-diyl group; $C^1$ is an alkyl group; j=1; p=1; q=0; r=2; and n=1.

Particularly preferable structures are given by the following combinations:

[1] The following formula (a-1) wherein Het is a sulfur atom; $B^1$ is a 1,4-phenylene group; $B^2$ is a trans-cyclohexyl group; $C^1$ is an alkyl group (preferably a methyl group, an ethyl group, a propyl group, a butyl group, a pentyl group or a hexyl group); j=1; p=2; q=0; r=1; and n=1.

[2] The following Formula (a-1) wherein Het is a sulfur atom; $B^1$ is a 1,4-phenylene group; $B^2$ is a trans-cyclohexane-1,4-diyl group; $C^1$ is an alkyl group (preferably a methyl group, an ethyl group, a propyl group, a butyl group, a pentyl group or a hexyl group); j=1; p=1; q=0; r=2; and n=1.

[2] The following Formula (a-2) wherein Het represents a sulfur atom, $B^1$ represents 1,4-phenylene group, $B^2$ represents trans-cyclohexane-1,4-diyl group, $C^1$ represents an alkyl group (preferably methyl group, ethyl group, propyl group, butyl group, pentyl group, or hexyl group), j=1, p=1, q=0, r=2, and n=1.

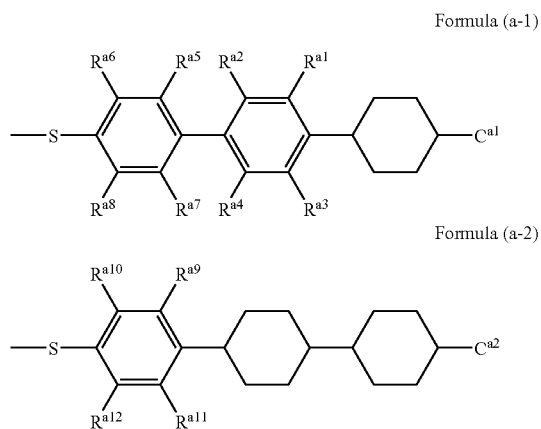

Formula (a-1)

Formula (a-2)

In Formula (a-1) and (a-2), $R^{a1}$ to $R^{a12}$ each independently represent a hydrogen atom or a substituent. Examples of the substituent in Formula (a-1) and (a-2) include the substituents in Group V.

It is preferable that $R^{a1}$ to $R^{a12}$ each independently represent a hydrogen atom, a halogen atom (in particular, a fluorine atom), an alkyl group, an aryl group and an alkoxy group. Preferable examples of an alkyl group, an aryl group and an alkoxy group represented by $R^{a1}$ to $R^{a12}$ are respectively the same as the alkyl group, aryl group and alkoxy group in Group V.

In Formula (a-1) and (a-2), $C^{a1}$ and $C^{a2}$ each independently represent an alkyl group, preferably an alkyl group having 1 to 20 carbon atoms, more preferably 1 to 10 carbon atoms and particularly preferably a methyl group, an ethyl group, a propyl group, a butyl group, a pentyl group and a hexyl group.

Examples of an azo dye include, but not limited to, a monoazo dye, a bisazo dye, a trisazo dye, a tetraxisazo dye, a pentaxisazo dye; preferably a monoazo dye, a bisazo dye and a trisazo dye.

Examples of a ring structure in the azo dye include an aromatic ring (e.g. a benzene ring and a naphthalene ring), and a hetero ring (e.g. a quinoline ring, a pyridine ring, a thiazole ring, a benzothiazole ring, an oxazole ring, a benzoxazole ring, an imidazole ring, a benzimidazole ring and a pyrimidine ring).

Preferable examples of a substituent for an anthraquinone dye include a substituent comprising an oxygen atom, a sulfur atom or a nitrogen atom such as an alkoxy group, an aryloxy group, an alkylthio group, an arylthio group, an alkylamino group and arylamino group. The number of substitutions is not particularly limited, but preferably di-substitution, tri-substitution and tetrakis-substitution, and particularly preferably di-substitution and tri-substitution. The position of the substitution is not particularly limited, but preferably 1,4-di-substitution, 1,5-di-substitution, 1,4,5-tri-substitution, 1,2,4-tri-substitution, 1,2,5-tri-substitution, 1,2,4,5-tetra-substitution and 1,2,5,6-tetra-substitution.

Preferable examples of the anthraquinone-base dye include a compound represented by following Formula (2).

Formula (2):

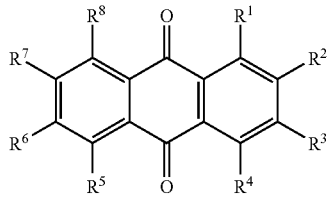

In Formula (2), at least one of $R^1$, $R^2$, $R^3$, $R^4$, $R^5$, $R^6$, $R^7$ and $R^8$ represents $-(Het)_j-\{(B^1)_p-(Q^1)_q-(B^2)_r\}_n-C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$, and $B^2$ may be the same or different; when n is 2 or greater, two or more of $\{(B^1)_p-(Q^1)_q-(B^2)_r\}$ may be the same or different.

Preferable ranges of Het, $B^1$, $B^2$, $Q^1$, $C^1$, j, p, q, r and n in Formula (2) are equal to the preferable ranges of Het, $B^1$, $B^2$, $Q^1$, $C^1$, j, p, q, r and n in Formula (1).

Examples of the substituent in Formula (2) include the substituents in Group V; preferably a halogen atom (a fluorine atom, a chlorine atom, a bromine atom, an iodine atom), an alkyl group (e.g. a methyl group, an ethyl group, a propyl group, a butyl group), an aryl group (e.g. phenyl group), an alkoxy group (e.g. a methoxy group) and an aryloxy group (e.g. a phenoxy group); more preferably a halogen atom (in particular, a fluorine atom) and an alkyl group (in particular, a methyl group, an ethyl group, a butyl group).

Further preferably, at least one of $R^1$, $R^4$, $R^5$ and $R^8$ in Formula (2) represents -(Het)$_j$-{(B$^1$)$_p$-(Q$^1$)$_q$-(B$^2$)$_r$}$_n$—C$^1$.

Preferable examples of a substituent for a phenoxazone dye (phenoxazine-3-on) include a substituent comprising an oxygen atom, a sulfur atom or a nitrogen atom, e.g. an alkoxy group, an aryloxy group, an alkylthio group, an arylthio group, an alkylamino group, and an arylamino group.

More preferable example of the phenoxazone dye is a compound represented by following Formula (3);

Formula (3):

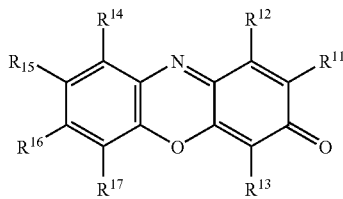

In Formula (3), at least one of $R^{11}$, $R^{12}$, $R^{13}$, $R^{14}$, $R^{15}$, $R^{16}$ and $R^{17}$ represents -(Het)$_j$-{(B$^1$)$_p$-(Q$^1$)$_q$-(B$^2$)$_r$}$_n$—C$^1$ and the other(s) independently represent(s) a hydrogen atom or a substituent; Het is an oxygen atom or a sulfur atom; B$^1$ and B$^2$ each independently represent an arylene group, a heteroarylene group or a divalent cyclic aliphatic hydrocarbon group; Q$^1$ represents a divalent linking group; C$^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by B$^1$ and B$^2$ is an integer of 3 to 10; when p, q, and r are respectively 2 or greater, two or more of B$^1$, Q$^1$ and B$^2$ may be the same or different; when n is 2 or greater, two or more of {(B$^1$)$_p$-(Q$^1$)$_q$-(B$^2$)$_r$} may be the same or different.

Preferable ranges of B$^1$, B$^2$, Q$^1$, C$^1$, p, q, r, and n in Formula (3) are equal to the ranges of B$^1$, B$^2$, Q$^1$, C$^1$, p, q, r, and n in Formula (1).

Examples of the substituents in Formula (3) include the substitutents in Group V; preferably an arylcarbamoyl group, an amino group, a halogen atom (a fluorine atom in particular), and an alkyl group (e.g. a methyl group and an ethyl group), an alkoxy group (e.g. a methoxy group), an aryloxy group (e.g. a phenoxy group); more preferably an arylcarbamoyl group and an amino group.

Further preferably, at least one of $R^{11}$, $R^{14}$ and $R^{16}$ in Formula (3) represents -(Het)$_j$-{(B$^1$)$_p$-(Q$^1$)$_q$-(B$^2$)$_r$}$_n$—C$^1$.

Specific examples of a anthraquinone dye and/or a phenoxazone dye which can be used as the dichroic dye in the present invention include, but the present invention is not limited to, the following specific examples.

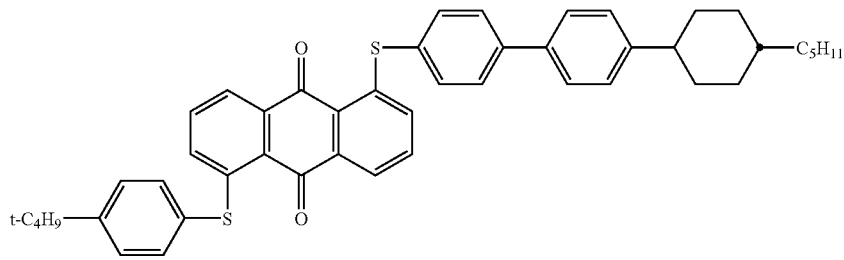

No. 1-1

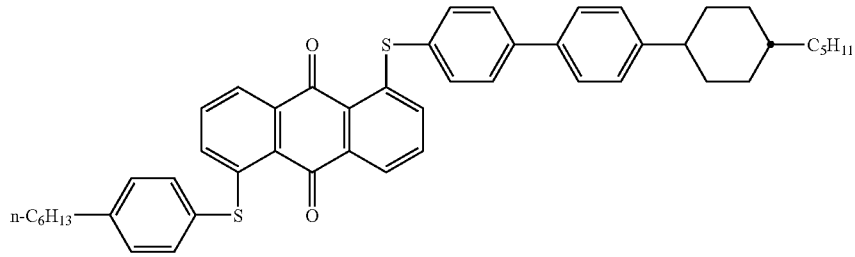

No. 1-2

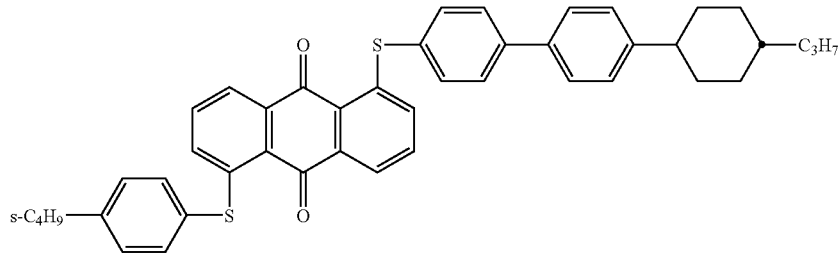

No. 1-3

-continued
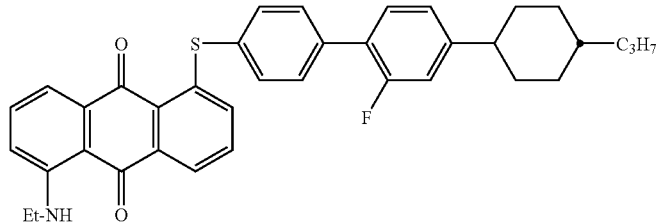
No. 1-4
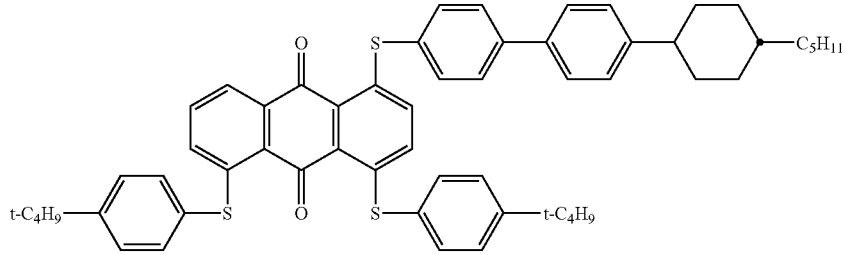
No. 1-5
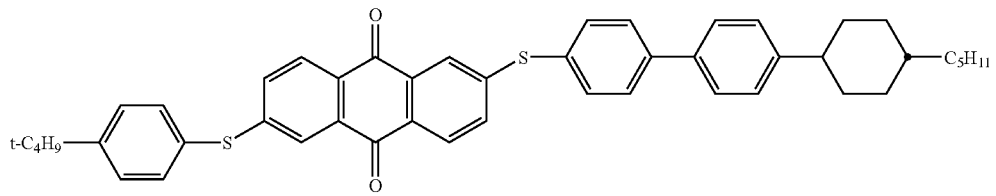
No. 1-6
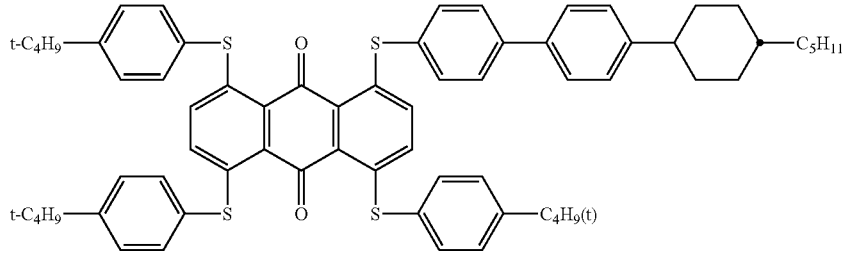
No. 1-7
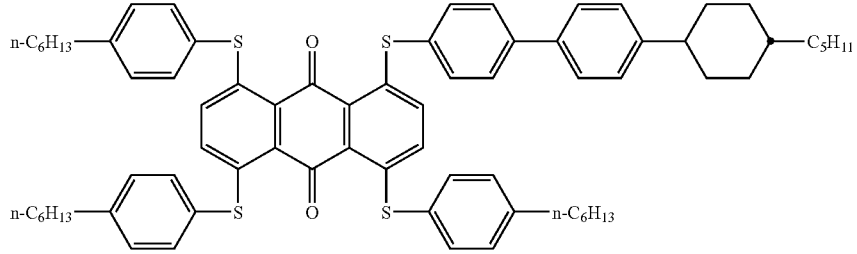
No. 1-8
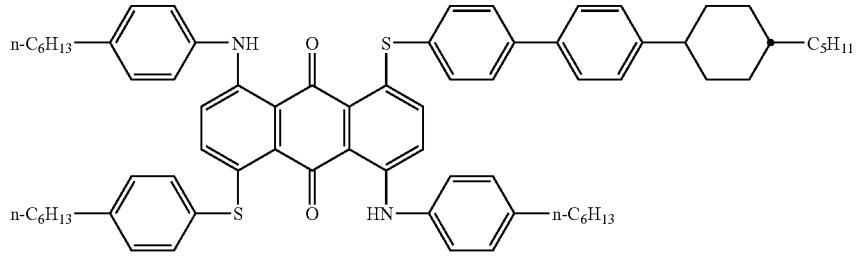
No. 1-9

-continued
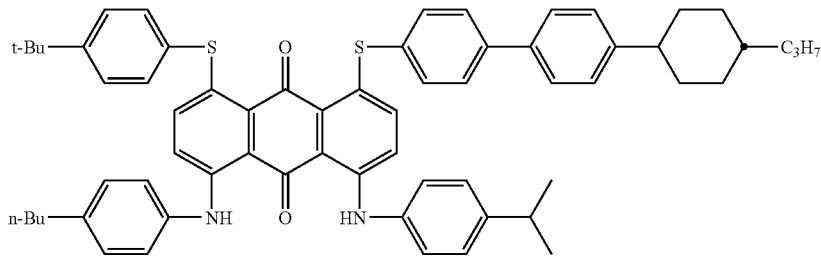
No. 1-10
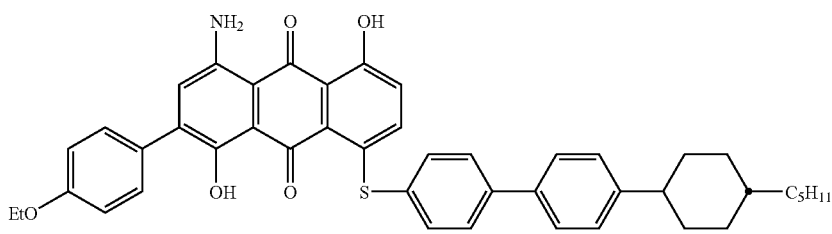
No. 1-11
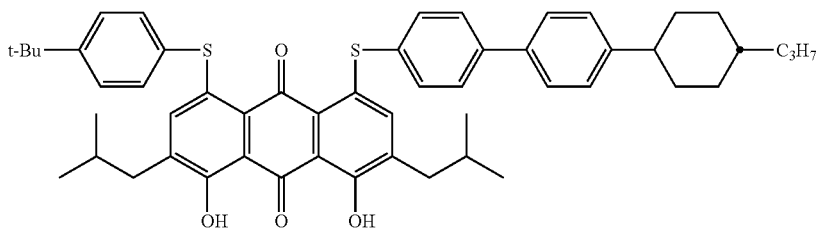
No. 1-12
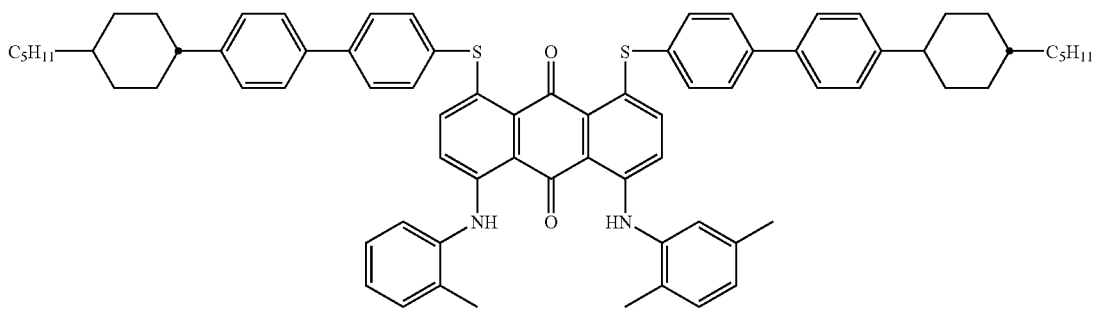
No. 1-13
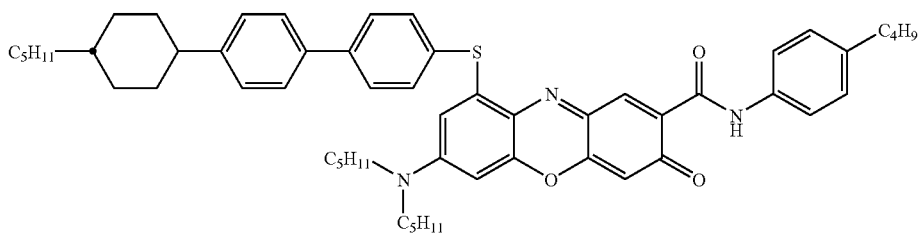
No. 1-14

-continued
No. 1-15
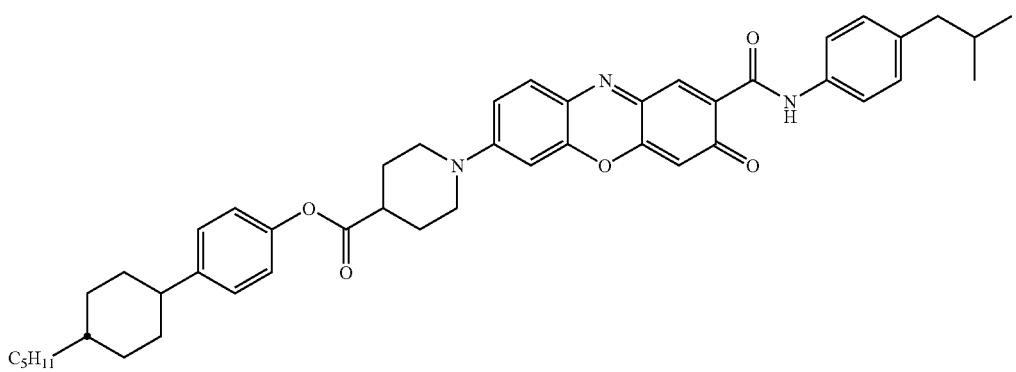
No. 1-16
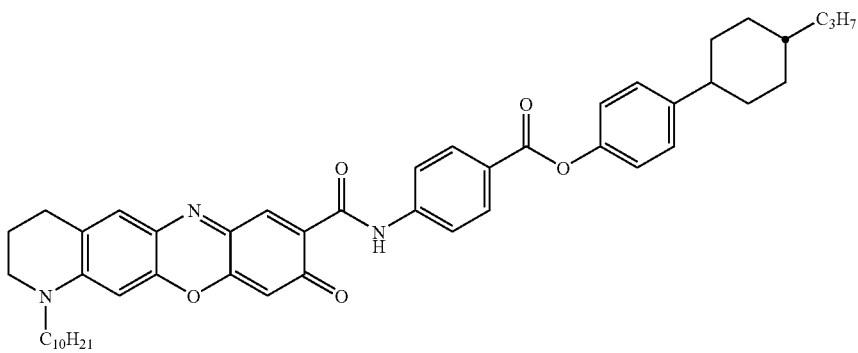
No. 1-17
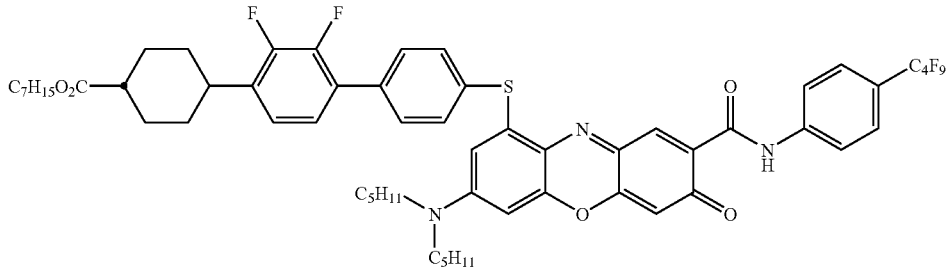
Specific examples of an azo-base dichroic dye which can be used in the present invention include, but the present invention is not limited to, the following specific examples.
No. 2-1
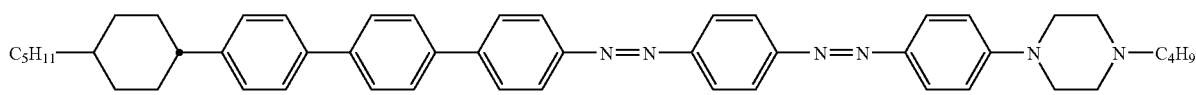
No. 2-2
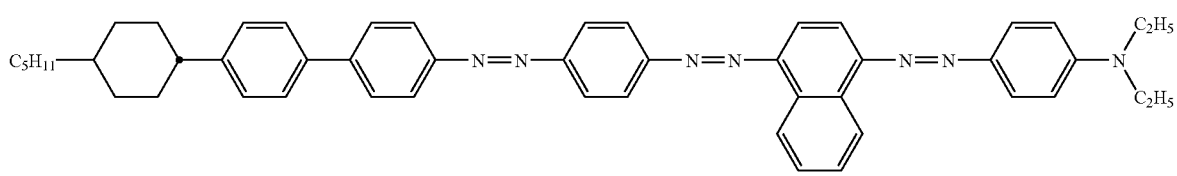

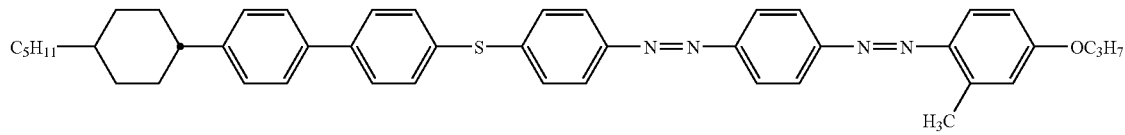

No. 2-3

Specific examples of a dioxazine-base dichroic dye and a merocyanine-base dichroic dye which can be used in the present invention include, but the present invention is not limited to, the following specific examples.

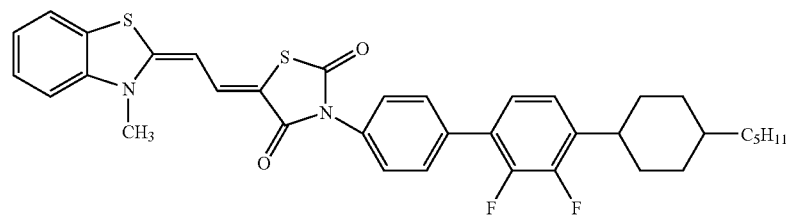

No. 3-1

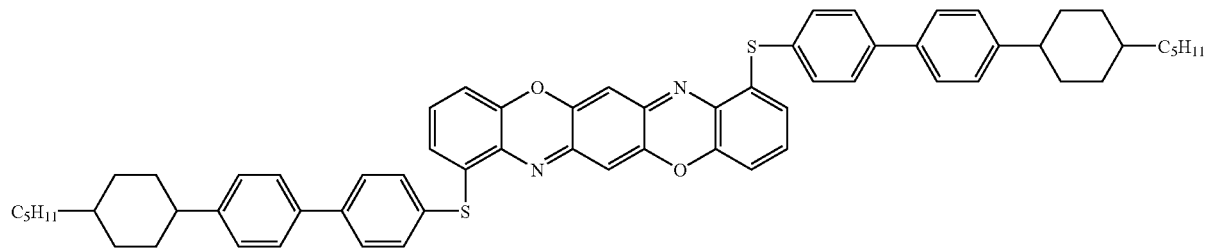

No. 3-2

The dichroic dye having a substituent represented by Formula (1) can be synthesized in accordance with known methods, e.g. a method disclosed in JP-A No. 2003-192664.

(Host Liquid Crystal)

Examples of a host liquid crystal which can be used for the liquid crystal composition of the present invention include, although not particularly limited as long as it can coexist with the component of the invention, a liquid crystal compound having a nematic phase or a smectic phase. Specific examples of such liquid crystal compound include an azomethine compound, a cyanobiphenyl compound, a cyanophenyl ester, a fluorine-substituted phenyl ester, a cyclohexanecarboxylic acid phenyl ester, a fluorine-substituted cyclohexanecarboxylic acid phenyl ester, a cyanophenylcyclohexane, a fluorine-substituted phenylcyclohexane, a cyano-substituted phenylpyrimidine, a fluorine-substituted phenylpyrimidine, an alkoxy-substituted phenylpyrimidine, a fluorine-substituted alkoxy-substituted phenylpyrimidine, a phenyldioxane, a tolan compounds, a fluorine-substituted tolan compounds, and an alkenylcyclohexylbenzonitrile.

The liquid crystal compound described in "Liquid Crystal Device Handbook" (edited by Committee 142, Japan Society for the Promotion of Science, Nikkan Kogyo Shimbun Ltd., 1989, 154-192, 715-722), may be used.

A fluorine-substituted host liquid crystal suitable for TFT active matrix driving system may also be used; e.g. ZLI-4692, MLC-6267, 6284, 6287, 6288, 6406, 6422, 6423, 6425, 6435, 6437, 7700, 7800, 9000, 9100, 9200, 9300, 10000 (manufactured by Merck Ltd.), LIXON 5036xx, 5037xx, 5039xx, 5040xx, 5041xx (manufactured by Chisso Corp).

The dielectric anisotropy of a host liquid crystal used in the present invention may be either positive or negative.

In the case wherein a host liquid crystal having a positive dielectric anisotropy is used, the liquid crystal is horizontally oriented, and a dichroic dye is also horizontally oriented to absorb the light, when no voltage is applied; in contrast, when a voltage is applied, the liquid crystal molecules incline vertically and so does the dichroic dye to transmit the light. In other words, it makes the mode to display white when a voltage is applied and black when no voltage is applied.

In the case wherein a host liquid crystal having a negative dielectric anisotropy, the liquid crystal is vertically oriented, and a dichroic dye is also vertically oriented to transmit the light, when no voltage is applied; in contrast, when a power voltage is applied, the liquid crystal molecules incline horizontally and so does the dichroic dye to absorb the light. In other words, it makes the mode to display black when a voltage is applied and white when no voltage is applied.

In order to impart a negative dielectric anisotropy to a liquid crystal, high dielectric anisotropy is required in the direction of the miner axis of a liquid crystal molecule. Examples of such liquid crystal are described in "GEKKAN DISPLAY (Monthly Display)", April issue, 2000, 4-9; and "Synlett", Vol. 4, 1999, 389-396. In view of a voltage holding ratio, a liquid crystal preferably has a negative dielectric anisotropy and comprises a fluorine-based substituent, e.g. the liquid crystals such as MLC-6608, 6609, 6610 (manufactured by Merck Ltd.).

A guest-host display device is a device wherein a liquid crystal composition prepared by dissolving a dichroic dye into a nematic liquid crystal is included in the cells. When an electric field is applied to the device, the dichroic dye changes its orientation as the liquid crystal moves, changing the light-absorption state of the cell to display.

Such a guest-host display device provides a driving system without a deflecting plate, which has an advantage such as a brighter display compared to a conventional liquid crystal display device.

Furthermore, a dual-frequency driving liquid crystal can be used in the guest-host display device of the present invention. By using a dual-frequency driving liquid crystal in the image display device of the present invention, the orientation of the liquid crystal can be reversibly changed without the help of an oriented film. The dual-frequency deriving liquid crystal is a liquid crystal wherein the dielectric anisotropy is positive when the frequency of the electric field to be applied to the liquid crystal is in the low-frequency region, and the dielectric anisotropy turns to negative when the frequency of the electric field is in the high-frequency region. Detailed descriptions are shown in "Liquid Crystal Device Handbook" (edited by Committee 142, Japan Society for the Promotion of Science, Nikkan Kogyo Shimbun Ltd., 1989, 189-192). As a specific example, a dual-frequency driving liquid crystal (manufactured by Sigma-Aldrich Corp.) is shown as below.

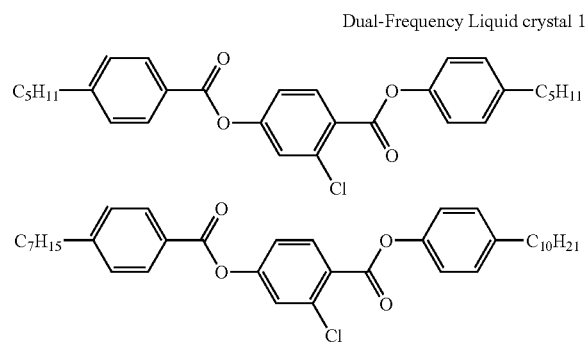

Dual-Frequency Liquid crystal 1

Other dual-frequency driving liquid crystals are also commercially available; e.g. DF-02XX, DF-05XX, FX-1001 and FX-1002 (manufactured by Chisso Corp.); MLC-2048 (manufactured by Merck Ltd.).

The dual-frequency driving liquid crystal used in the present invention may be a combination of plural liquid crystal compounds. Further, it may also comprise a liquid crystal compound which does not change the sign of a dielectric anisotropy whether the frequency region of the electric field to be applied is high or low.

Preferable range of the frequency region of the voltage to be applied to the liquid crystal layer, although varies with the type or the cross-over frequency of the liquid crystal compositions, is generally 0.1 Hz to 10 MHz, more preferably 1 Hz to 1 MHz.

For a dual-frequency driving liquid crystal, the voltage in both low and high frequency region is applied. The low frequency region is preferably from 0.1 Hz to 100 kHz, more preferably 1 Hz to 10 kHz, and further preferably 10 Hz to 10 kHz. The high frequency region is, in general, preferably from 100 Hz to 10 MHz, more preferably 100 Hz to 1 MHz, and further preferably 1 kHz to 1 MHz.

In the present invention, a compound which does not have a liquid crystallinity may be added to adjust the physical properties of the liquid crystal to a desired range, e.g. the temperature range of the liquid crystal phase. Further, other compounds, e.g. a chiral compound, an ultraviolet absorber or an antioxidant may also be added. Examples of such additives include chiral agents for TN and STN, shown in "Liquid Crystal Device Handbook"(edited by Committee 142, Japan Society for the Promotion of Science, Nikkan Kogyo Shimbun Ltd., 1989, 199-202).

One of the preferable embodiments of the present invention is a mode utilizing a chiral nematic liquid crystal phase wherein a chiral compound is added. Examples of the chiral compound include R-811, S-811, R-1082 and R-1082 (manufactured by Merck Ltd.) The ratio of the chiral compound is preferably 0.01 to 15% by mass, more preferably 0.5 to 6% by mass.

The ratio of the content of the dichroic dye to the content of the host liquid crystal in the liquid crystal device of the present invention is, although not particularly limited to, preferably 0.1 to 15% by mass, and particularly preferably 0.5 to 6% by mass.

Further, it is preferable that the content of the dichroic dye is determined in accordance to the dye concentration which is required to achieve the desired optical concentration, by adjusting the composition of the liquid crystal composition and measuring the absorption spectra of the liquid crystal cells wherein the liquid crystal composition is contained.

The ratio of the content of a solid matter having a particle diameter of 1 nm to 10 µm to the content of the host liquid crystal in the liquid crystal device of the present invention is, although not particularly limited to, preferably 0.1 to 95% by mass, particularly preferably 5 to 70% by mass, and further preferably 5 to 30% by mass.

When the content of the solid matter is less than 0.1% by mass, an effect to orient the host liquid crystal three-dimensionally may decrease; and when more than 95% by mass, formation of a desired liquid crystal layer may become difficult.

(Display Device)

The display device of the present invention comprises a pair of electrodes wherein at least one of them is a transparent electrode; and a liquid crystal layer sandwiched between the pair of electrodes, the liquid crystal layer comprising the liquid crystal composition as described above.

The substrate used in the liquid crystal element of the present invention usually comprises a glass or a plastic, preferably a plastic. Examples of the plastic substrate used in the present invention include an acrylic resin, a polycarbonate resin and an epoxy resin; more precisely, a triacetyl cellulose (TAC), a polyethylene terephthalate (PET), a polyethylene naphthalate (PEN), a syndiotactic polystyrene (SPS), a polyphenylene sulfide (PPS), a polycarbonate (PC), a polyarylate (PAr), a polysulfone (PSF), a polyester sulfone (PES), a polyether imide (PEI), a cyclic polyolefin, and a polyimide (PI); and preferably a polyethylene terephthalate (PET).

The thickness of the plastic substrate is, although not particularly limited to, preferably 30 µm to 700 µm, more preferably 40 µm to 200 µm, and further preferably 50 µm to 150 µm. In any case, the haze is preferably 3% or less, more preferably 2% or less, and most preferably 1% or less; and the total light transmittance is preferably 70% or more, more preferably 80% or more, and further preferably 90% or more.

A resin property-reforming agent may be optionally added to the plastic substrate within the range wherein the property of the present invention is not impaired; e.g. a plasticizer, a dye, a pigment, an antistatic agent, an ultraviolet absorber, an antioxidant, an inorganic fine particle, a remover, a leveling agent or a lubricant.

The plastic substrate may be either light-transmissive or non-transmissive. When a non-transmissive substrate is used, a white substrate having a light reflectivity, e.g. a plastic substrate comprising an inorganic pigment such as a titanium oxide or a zinc oxide, may be used. It is noted that when the substrate comprises a display surface, the substrate is required to have a light transmittance, at least to the visible light.

The substrate is specifically described, for example, in "Liquid Crystal Device Handbook"(edited by Committee 142, Japan Society for the Promotion of Science, The Nikkan Kogyo Shimbun Ltd., 1989, 218-231).

An electrode layer is formed on the substrate, and the electrode layer is preferably a transparent electrode. The transparent electrode layer may comprise, for example, an indium oxide, an indium tin oxide (ITO), or a tin oxide. Examples of the transparent electrode are described, for example, in the pages 232 to 239 of "Liquid Crystal Device Handbook", edited by Committee 142, Japan Society for the Promotion of Science, Nikkan Kogyo Shimbunsha, 1989. The transparent electrode may be formed by means of a sputtering method, a sol-gel method or a printing method.

The liquid crystal element of the present invention can be driven by a simple matrix driving system or an active matrix driving system using a thin film transistor (TFT) or the like. Specific description of the driving system is given, for example, in the pages 387 to 460 of "Liquid Crystal Device Handbook", edited by Committee 142, Japan Society for the Promotion of Science, Nikkan Kogyo Shimbunsha, 1989; the liquid crystal driving system described therein is applicable for the present invention.

Illustrative embodiments of the present invention will be described herein:

1. A liquid crystal composition comprising at least a dichroic dye and a host liquid crystal, and further comprising particles of solid matter having an average particle diameter of 1 nm to 10 μm, wherein the dichroic dye has a substituent represented by the following formula (1):

Formula (1)

wherein Het is an oxygen atom or a sulfur atom; $B^1$ and $B^2$ each independently represent an arylene group, a heteroarylene group, or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5, respectively; n represents an integer of 1 to 3; the sum of the groups represented by $B^1$ and $B^2$ is an integer of 3 to 10; when p, q and r are respectively 2 or greater, two or more of $B^1$, $Q^1$ or $B^2$ may be the same or different; when n is 2 or greater, two or more of $\{(B^1)_p\text{-}(Q^1)_q\text{-}(B^2)_r\}$ may be the same or different.

2. The liquid crystal composition of 1 wherein the ratio of the content of the solid matter to the content of the host liquid crystal is 0.1 to 95% by mass.

3. The liquid crystal composition of 1 wherein the ratio of the content of the solid matter to the content of the host liquid crystal is 5 to 70% by mass.

4. The liquid crystal composition of 1 wherein the ratio of the content of the solid matter to the content of the host liquid crystal is 5 to 30% by mass.

5. The liquid crystal composition of 1 wherein at least one of the dichroic dyes is a compound represented by the following formula (2):

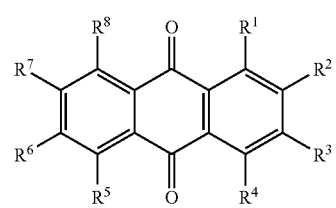

Formula (2)

wherein at least one of $R^1$, $R^2$, $R^3$, $R^4$, $R^5$, $R^6$, $R^7$ and $R^8$ represents -(Het)$_j$-$\{(B^1)_p\text{-}(Q^1)_q\text{-}(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$, and $B^2$ may be the same or different; when n is 2 or greater, two or more of $\{(B^1)_p\text{-}(Q^1)_q\text{-}(B^2)_r\}$ may be the same or different.

6. The liquid crystal composition of 1 wherein at least one of the dichroic dyes is a compound represented by the following formula (3):

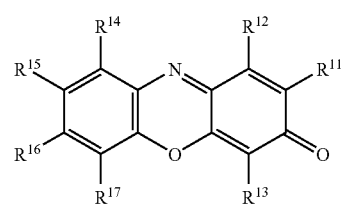

Formula (3)

wherein at least one of $R^{11}$, $R^{12}$, $R^{13}$, $R^{14}$, $R^{15}$, $R^{16}$ and $R^{17}$ represents -(Het)$_j$-$\{(B^1)_p\text{-}(Q^1)_q\text{-}(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$ and $B^2$ may be the same or different; when n is 2 or greater, two or more of $\{(B^1)_p\text{-}(Q^1)_q\text{-}(B^2)_r\}$ may be the same or different.

7. The liquid crystal composition of 1 wherein the host liquid crystal is a nematic liquid crystal or a smectic liquid crystal.

8. The liquid crystal composition of 1 wherein the host liquid crystal is a dual-frequency driving liquid crystal.

9. The liquid crystal composition of 1 wherein the solid matter is at least one selected from the group consisting of a layered clay compound, a montmorillonite, a silica gel, and a polymer particle.

10. The liquid crystal composition of 1 wherein a surface of the particles of solid matter has a partial structure of the liquid crystal.

11. A display device comprising a pair of electrodes wherein at least one electrode is a transparent electrode, and a liquid crystal layer sandwiched between the electrodes, the liquid crystal layer comprising the liquid crystal composition of 1.

12. The display device of 11 wherein the ratio of the content of the solid matter to the content of the host liquid crystal is 0.1 to 95% by mass.

13. The display device of 11 wherein the ratio of the content of the solid matter to the content of the host liquid crystal is 5 to 70% by mass.

14. The display device of 11 wherein the ratio of the content of the solid matter to the content of the host liquid crystal is 5 to 30% by mass.

15. The display device of 11 wherein at least one of the dichroic dyes is a compound represented by the following formula (2):

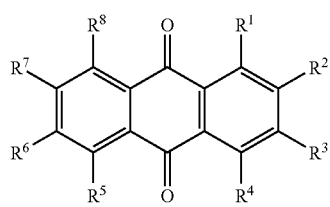

Formula (2)

wherein at least one of $R^1$, $R^2$, $R^3$, $R^4$, $R^5$, $R^6$, $R^7$ and $R^8$ represents -(Het)$_j$-{$(B^1)_p$-$(Q^1)_q$-$(B^2)_r$}$_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$, and $B^2$ may be the same or different; when n is 2 or greater, two or more of {$(B^1)_p$-$(Q^1)_q$-$(B^2)_r$} may be the same or different.

16. The display device of 11 wherein at least one of the dichroic dyes is a compound represented by the following formula (3):

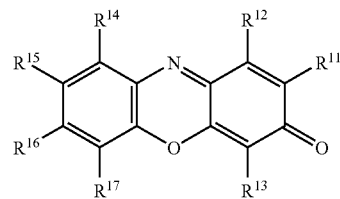

Formula (3)

wherein at least one of $R^{11}$, $R^{12}$, $R^{13}$, $R^{14}$, $R^{15}$, $R^{16}$ and $R^{17}$ represents -(Het)$_j$-{$(B^1)_p$-$(Q^1)_q$-$(B^2)_r$}$_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$ and $B^2$ may be the same or different; when n is 2 or greater, two or more of {$(B^1)_p$-$(Q^1)_q$-$(B^2)_r$} may be the same or different.

17. The display device of 11 wherein the host liquid crystal is a nematic liquid crystal or a smectic liquid crystal.

18. The display device of 11 wherein the host liquid crystal is a dual-frequency driving liquid crystal.

19. The display device of 11 wherein the solid matter is at least one selected from the group consisting of a layered clay compound, a montmorillonite, a silica gel, and a polymer particle.

20. The display device of 11 wherein a surface of the particles of solid matter has a partial structure of the liquid crystal.

EXAMPLES

The present invention is further described herein, substantiating with the following examples. The embodiments, e.g. the type of the materials, the amount and ratio of the materials, the contents of the processes and procedures shown in the examples may be properly modified within the range of the purpose of the present invention. Accordingly, the extent of the present invention is not limited by the following examples.

Example 1

Preparation of a Display Device

Process 1. Preparation of a Dichroic Dye and a Host Liquid Crystal

The aforementioned dichroic dyes (1-2), (1-8), (1-13) and (1-14) are synthesized in accordance with the methods described in JP-A No.2003-192664 and Japanese Patent Application No.2004-050265.

The aforementioned dual-frequency driving nematic liquid crystal 1 (manufactured by Sigma-Aldrich Corp.) is used as a liquid crystal.

The following dichroic dyes Y-1, M-1 and C-1 are used for comparison.

Comparison 1: Dichroic Dyes Described in Jpn. J. Appl. Phys. vol. 37, 3422 (1998)

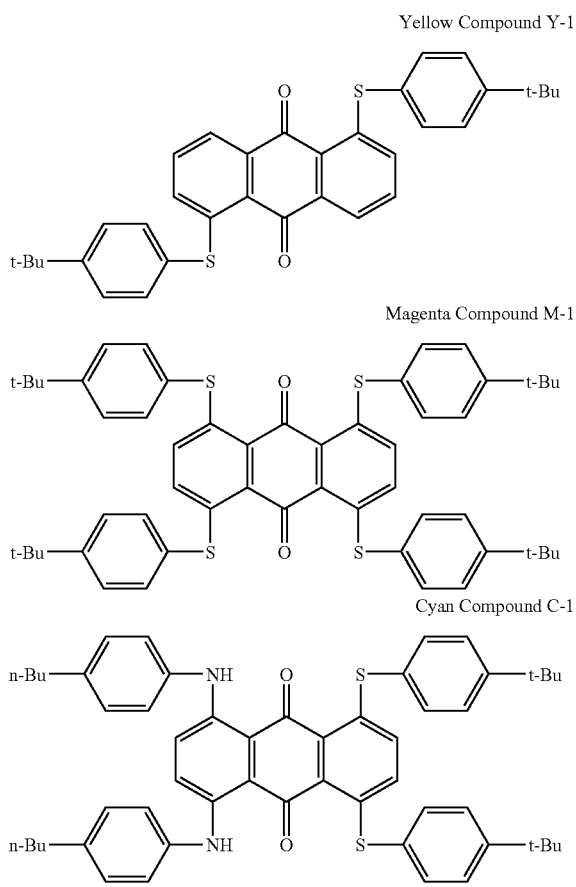

Process 2. Preparation of a Clay Compound

A montmorillonite "Kunipia F" (manufactured by Kunimine Industries Co., Ltd.) is subjected to surface modification using a 4-(11-aminoundecyloxy)-4'-cyanobisphenyl as a surface modifier, in accordance with the method described in JP-A No.7-318982.

An average major diameter of the resulting clay compound measured by an electron micrograph is 0.4 μm.

Clay compounds shown in Table 1 are prepared in accordance with the aforementioned method, except that "Sumecton" (manufactured by Kunimine Industries Co., Ltd.) is applied for the purpose of adjusting the particle diameter. In Table 1, the average particle diameter of the clay compounds is the average major diameter measured by an electron micrograph; and the aspect ratio is the value calculated from the major diameter and the thickness of the particles measured by an electron micrograph.

Process 3. Preparation of a Liquid Crystal Composition 3.0 mg of the dichroic dye and 1.0 g of the liquid crystal are combined to prepare the examples 1 to 11 in Table 1 in the manner that the combinations are diversified, heated to dissolve and left for a day at room temperature, then subjected to hybridization with a montmorillonite in accordance with the method described in JP-A No.7-318982.

The obtained liquid crystal composition is applied on a glass substrate provided with a transparent electrode (ITO), and a spacer having a diameter of 10 μm is disposed on the substrate, covered with the glass substrate provided with a transparent electrode (ITO) to sandwich and fix the liquid crystal composition.

Evaluation of Dual-Frequency Driving Property

To evaluate the dual-frequency driving property of the liquid crystal device prepared in Process 3, an alternating voltage of 60 Hz and 100v (as a low frequency voltage) and an alternating voltage of 100 kHz and 100 v (as a high frequency voltage) are applied.

The contrast ratio of examples 1 to 11 is measured in view of; (1) the state of light-transmittance when a low frequency voltage was applied, and (2) the state of light-absorption when a high frequency voltage was applied. Results are shown as below;

TABLE 1

| Liquid Crystal Element | Dichroic Dye | Clay Compound Average Particle Diameter (μm) | Aspect Ratio | Content to Host Liquid Crystal (%) | Contrast Ratio | Remarks |
| --- | --- | --- | --- | --- | --- | --- |
| 1 | 1-2 | 0.4 | 100 | 10 | 6.5 | The invention |
| 2 | 1-8 | 0.4 | 100 | 10 | 5.9 | The invention |
| 3 | 1-13 | 0.4 | 100 | 10 | 6.3 | The invention |
| 4 | 1-14 | 0.4 | 100 | 10 | 6.3 | The invention |
| 5 | Y-1 | 0.4 | 100 | 10 | 4.5 | Comparative |
| 6 | M-1 | 0.4 | 100 | 10 | 4.0 | Comparative |
| 7 | C-1 | 0.4 | 100 | 10 | 3.8 | Comparative |
| 8 | 1-2 | 0.2 | 200 | 10 | 6.4 | The invention |
| 9 | 1-8 | 0.2 | 200 | 10 | 5.9 | The invention |
| 10 | 1-2 | 12 | 1 | 20 | 2.4 | Comparative |
| 11 | 1-8 | 12 | 1 | 20 | 2.2 | Comparative |

As shown in Table 1, the liquid crystal device of the present invention has a high contrast ratio, the result is based on that; (1) the liquid crystal device of the present invention achieves an absorption condition which is independent of polarization, and (2) the light-absorption of the liquid crystal device of the present invention is low under the condition wherein a low frequency voltage was applied and the light is transmitted, when the dichroic dye of the present invention is used. That is, the liquid crystal device of the invention functions effectively as an optical shutter based on a dual-frequency driving system. Furthermore, the liquid crystal composition of the invention has a so-called memory function, a property to retain the condition at the time that a voltage is applied, even after no voltage is applied any more.

It is found difficult to prepare or disperse a clay compound having an average particle diameter of 1 nm or less.

Example 2

Preparation of a Liquid Crystal Composition and a Liquid Crystal Device 100 mg of a toluene solvent having a solid content of 40% by mass wherein silica gel particles having a particle diameter of 13 nm (manufactured by FUSO CHEMICAL Co., Ltd.) are dispersed; 3.0 mg of a dichroic dye shown in Table 2; and 1.0 g of a liquid crystal are combined, then heated to dissolve and left for a day at room temperature.

The obtained liquid crystal composition is applied on a glass substrate provided with a transparent electrode (ITO), and a spacer having a diameter of 10 μm is disposed on the substrate, covered with the glass substrate provided with a transparent electrode (ITO) to sandwich and fix the liquid crystal composition.

Examples 20 to 24 shown in Table 2 are prepared in accordance with the above-mentioned method, except that the silica gel particles with diversified particle diameters are used. Results are shown as below;

Evaluation of Dual-Frequency Driving Property

To evaluate the dual-frequency driving property of the liquid crystal device obtained in Example 2, an alternating voltage of 60 Hz and 100 v (as a low frequency voltage) and an alternating voltage of 100 kHz and 100 v (as a high frequency voltage) are applied.

The contrast ratio of examples 20 to 24 are measured in view of; (1) the state of light-transmittance when a low frequency voltage was applied, and (2) the state of light-absorption when a high frequency voltage was applied.

TABLE 2

| Liquid Crystal Element | Dichroic Dye | Average Particle Diameter of Silica Gel Particles | Contrast Ratio | Remarks |
|---|---|---|---|---|
| 20 | 1-2 | 13 nm | 6.0 | The invention |
| 21 | 1-2 | 20 nm | 6.0 | The invention |
| 22 | 1-2 | 40 nm | 6.0 | The invention |
| 23 | 1-2 | 100 nm | 5.9 | The invention |
| 24 | Y-1 | 13 nm | 4.0 | Comparative |

As shown in Table 2, the liquid crystal device of the present invention has a high contrast ratio when a silica gel particle having an average particle diameter of 1 nm to 10 μm is used as a clay compound. The result is attributed to the facts that are: (1) the liquid crystal device of the present invention achieves an absorption state which is independent of polarization; and (2) the light-absorption of the liquid crystal device of the present invention is low under the condition wherein a low frequency voltage was applied and the light is transmitted, when the dichroic dye of the present invention is used. That is, the liquid crystal device of the invention functions effectively as an optical shutter based on a dual-frequency driving system.

It is found difficult to prepare or disperse a clay compound having an average particle diameter of 1 nm or less.

Example 3

Liquid crystal devices as Examples 31 to 34 shown in Table 3 are prepared in accordance with the same method as Example 1 shown in Table 1, except the ratio of the content of the clay compound to the content of the host liquid crystal. Results are shown as below;

TABLE 3

| Liquid Crystal Device | Dichroic Dye | Content of Claycompound to Host Liquid Crystal (%) | Contrast Ratio | Remarks |
|---|---|---|---|---|
| 31 | 1-2 | 10 | 6.5 | The invention |
| 32 | 1-2 | 5 | 6.0 | The invention |
| 33 | 1-2 | 20 | 6.2 | The invention |
| 34 | 1-2 | 30 | 5.8 | The invention |

As shown in Table 3, each of the liquid crystal devices of the invention exhibits a high contrast ratio, which is particularly high when the ratio of the content of a clay compound is 10 to 20%.

In consequence, the present invention provides a guest-host liquid crystal composition with a light-absorption condition which is independent of polarization and a display device.

Since the liquid crystal composition of the present invention comprises at least one kind of solid matter having a specified size and a dichroic dye having a specified substituent, adsorption of the dichroic dye to the solid matter is suppressed, whereby some display functions such as a contrast ratio are improved.

There is an advantage such that the electric power consumption becomes significantly low when the liquid crystal composition of the present invention has a memory function.

Additionally, when the liquid crystal composition of the present invention further includes a dual-frequency driving liquid crystal as a host liquid crystal, the present invention provides such effects that the oriented film becomes unnecessary and the orientation becomes reversibly changeable, as well as that a display function such as a contrast ratio improves.

What is claimed is:

1. A liquid crystal composition comprising at least a dichroic dye and a host liquid crystal, and further comprising particles of solid matter having an average particle diameter of 1 nm to 10 μm, wherein the dichroic dye has a substituent represented by the following formula (1):

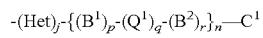

Formula (1):

wherein Het is an oxygen atom or a sulfur atom; $B^1$ and $B^2$ each independently represent an arylene group, a heteroarylene group, or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group, or an acyloxy group; j represents 0 or 1; p, q, and r represent an integer of 0 to 5, respectively; n represents an integer of 1 to 3; the sum of the groups represented by $B^1$ and $B^2$ is an integer of 3 to 10; when p, q and r are respectively 2 or greater, two or more of $B^1$, $Q^1$ or $B^2$ may be the same or different; when n is 2 or greater, two or more of $\{(B^1)_p\text{-}(Q^1)_q\text{-}(B^2)_r\}$ may be the same or different.

2. The liquid crystal composition of claim 1 wherein the ratio of the content of the solid matter to the content of the host liquid crystal is 0.1 to 95% by mass.

3. The liquid crystal composition of claim 1 wherein the ratio of the content of the solid matter to the content of the host liquid crystal is 5 to 70% by mass.

4. The liquid crystal composition of claim 1 wherein the ratio of the content of the solid matter to the content of the host liquid crystal is 5 to 30% by mass.

5. The liquid crystal composition of claim 1 wherein at least one of the dichroic dyes is a compound represented by the following formula (2):

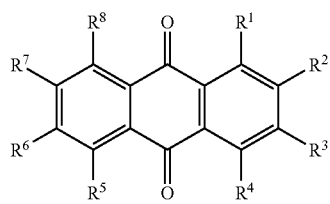

Formula (2)

wherein at least one of $R^1$, $R^2$, $R^3$, $R^4$, $R^5$, $R^6$, $R^7$ and $R^8$ represents -(Het)$_j$-$\{(B^1)_p$-$(Q^1)_q$-$(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$, and $B^2$ may be the same or different; when n is 2 or greater, two or more of $\{(B^1)_p\text{-}(Q^1)_q\text{-}(B^2)_r\}$ may be the same or different.

6. The liquid crystal composition of claim 1 wherein at least one of the dichroic dyes is a compound represented by the following formula (3):

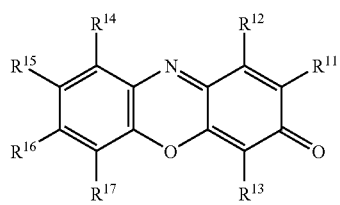

Formula (3)

wherein at least one of $R^{11}$, $R^{12}$, $R^{13}$, $R^{14}$, $R^{15}$, $R^{16}$ and $R^{17}$ represents -(Het)$_j$-$\{(B^1)_p$-$(Q^1)_q$-$(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$ and $B^2$ may be the same or different; when n is 2 or greater, two or more of $\{(B^1)_p\text{-}(Q^1)_q\text{-}(B\ 2)_r\}$ may be the same or different.

7. The liquid crystal composition of claim 1 wherein the host liquid crystal is a nematic liquid crystal or a smectic liquid crystal.

8. The liquid crystal composition of claim 1 wherein the host liquid crystal is a dual-frequency driving liquid crystal.

9. The liquid crystal composition of claim 1 wherein the solid matter is at least one selected from the group consisting of a layered clay compound, a montmorillonite, a silica gel, and a polymer particle.

10. The liquid crystal composition of claim 1, wherein a surface of the particles of solid matter has a structure selected from a group consisting of a substituent represented by Formula (1), azomethine, cyanobiphenyl, cyanophenyl ester, fluorine-substituted phenyl ester, cyclohexanecarboxylic acid phenyl ester, phenylpyrimidine, tolan and phenyldioxane.

11. A display device comprising a pair of electrodes wherein at least one electrode is a transparent electrode, and a liquid crystal layer sandwiched between the electrodes, the liquid crystal layer comprising the liquid crystal composition of claim 1.

12. The display device of claim 11 wherein the ratio of the content of the solid matter to the content of the host liquid crystal is 0.1 to 95% by mass.

13. The display device of claim 11 wherein the ratio of the content of the solid matter to the content of the host liquid crystal is 5 to 70% by mass.

14. The display device of claim 11 wherein the ratio of the content of the solid matter to the content of the host liquid crystal is 5 to 30% by mass.

15. The display device of claim 11 wherein at least one of the dichroic dyes is a compound represented by the following formula (2):

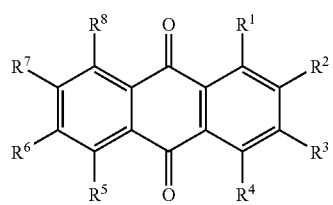

Formula (2)

wherein at least one of $R^1$, $R^2$, $R^3$, $R^4$, $R^5$, $R^6$, $R^7$ and $R^8$ represents -(Het)$_j$-$\{(B^1)_p$-$(Q^1)_q$-$(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$, and $B^2$ may be the same or different; when n is 2 or greater, two or more of $\{(B^1)_p\text{-}(Q^1)_q\text{-}(B^2)_r\}$ may be the same or different.

16. The display device of claim 11 wherein at least one of the dichroic dyes is a compound represented by the following formula (3):

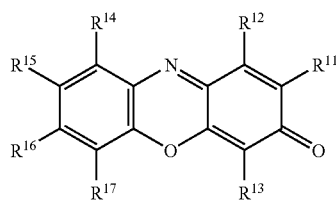

Formula (3)

wherein at least one of $R^{11}$, $R^{12}$, $R^{13}$, $R^{14}$, $R^{15}$, $R^{16}$ and $R^{17}$ represents -(Het)$_j$-$\{(B^1)_p\text{-}(Q^1)_q\text{-}(B^2)_r\}_n$—$C^1$ and the other(s) independently represent(s) a hydrogen atom or a substituent; Het is an oxygen atom or a sulfur atom; $B^1$ and $B^2$ each independently represent an arylene group, a heteroarylene group or a divalent cyclic aliphatic hydrocarbon group; $Q^1$ represents a divalent linking group; $C^1$ represents an alkyl group, a cycloalkyl group, an alkoxy group, an alkoxycarbonyl group, an acyl group or an acyloxy group; j represents 0 or 1; p, q and r each independently represent an integer of 0 to 5; n represents an integer of 1 to 3; the sum of the groups represented by $B^1$ and $B^2$ is an integer of 3 to 10; when p, q, and r are respectively 2 or greater, two or more of $B^1$, $Q^1$ and $B^2$ may be the same or different; when n is 2 or greater, two or more of $\{(B^1)_p\text{-}(Q^1)_q\text{-}(B^2)_r\}$ may be the same or different.

17. The display device of claim 11 wherein the host liquid crystal is a nematic liquid crystal or a smectic liquid crystal.

18. The display device of claim 11 wherein the host liquid crystal is a dual-frequency driving liquid crystal.

19. The display device of claim 11 wherein the solid matter is at least one selected from the group consisting of a layered clay compound, a montmorillonite, a silica gel, and a polymer particle.

20. The display device of claim 11, wherein a surface of the particles of solid matter has a structure selected from a group consisting of a substituent represented by Formula (1), azomethine, cyanobiphenyl, cyanophenyl ester, fluorine-substituted phenyl ester, cyclohexanecarboxylic acid phenyl ester, phenylpyrimidine, tolan and phenyldioxane.

* * * * *